(No Model.)
C. C. FIELD.
WAGON SEAT.
No. 512,018. Patented Jan. 2, 1894.
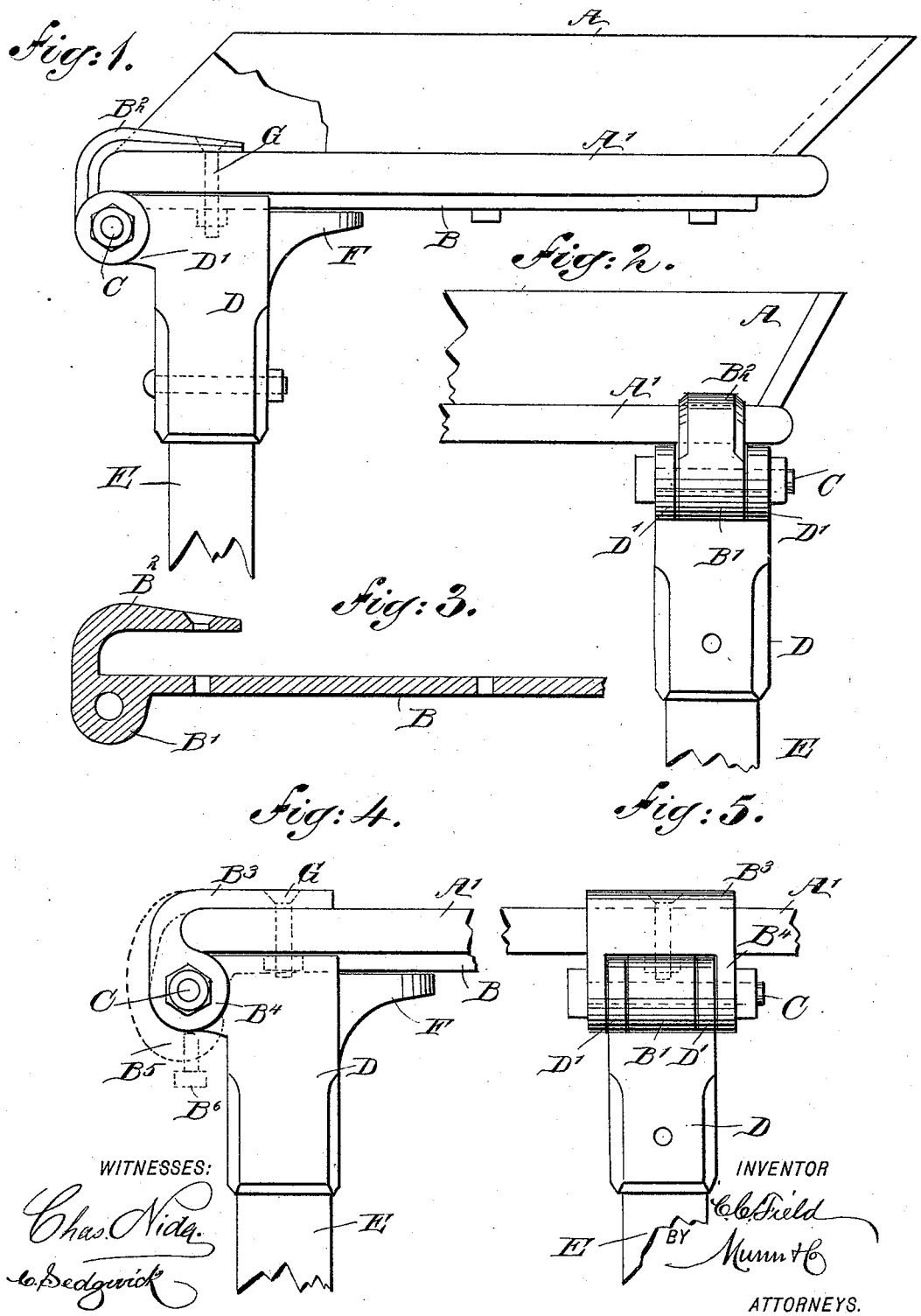
WITNESSES:
Chas. Nida.
C. Sedgwick
INVENTOR
C. C. Field
BY Munn & Co
ATTORNEYS.

UNITED STATES PATENT OFFICE.

CHARLES C. FIELD, OF NEW YORK, N. Y.

WAGON-SEAT.

SPECIFICATION forming part of Letters Patent No. 512,018, dated January 2, 1894.

Application filed October 21, 1893. Serial No. 488,764. (No model.)

*To all whom it may concern:*

Be it known that I, CHARLES C. FIELD, of the city, county, and State of New York, have invented a new and Improved Wagon-Seat, of which the following is a full, clear, and exact description.

The invention relates to wagon seats, such as shown and described in the Letters Patent of the United States, No. 503,411, granted to me August 15, 1893.

The object of the present invention is to provide a new and improved wagon seat, in which the seat is securely held in place on its supporting bar, without danger of breaking or weakening the pivot bolt and other parts.

The invention consists of a reinforcing arm extending up over the front edge of the seat bottom.

The invention also consists of certain parts and details, and combinations of the same, as will be fully described hereinafter and then pointed out in the claims.

Reference is to be had to the accompanying drawings forming a part of this specification, in which similar letters of reference indicate corresponding parts in all the figures.

Figure 1 is a side elevation of the improvement with part of the seat broken out. Fig. 2 is a front elevation of the same. Fig. 3 is a sectional side elevation of the seat bar and the reinforcing arm. Fig. 4 is a side elevation of a modified form of the improvement; and Fig. 5 is a front elevation of the same.

The wagon seat A, is fastened at the under side of its bottom A', to the supporting bars B arranged near the sides of the seat, only one of the bars being shown in the drawings. The front end of each bar B, is formed with the usual eye B' engaged by the bolt C held in lugs D' forming part of the socket D, secured on the upper end of the post E.

From the socket D, extends rearward the seat rest F, on which is seated the bar B at the time the seat A is in a horizontal position. The top surface of the seat bottom A' is engaged at the front of the seat, by an arm $B^2$, preferably made integral with the bar B, and extending upward and rearward from the front end of the bar, as will be understood by reference to Figs. 1 and 3.

A bolt G extends from the arm $B^2$ through the seat bottom A' and the bar B, the nut of the said bolt passing through the usual aperture in the top of the socket D, so as to permit the bar B, to rest firmly on the top of the socket and its seat rest F. The arm $B^2$, thus extends above and in alignment with the seat bar B, and it forms an abutment at its front end for the front edge of the seat bottom A'. If desired, this reinforcing arm $B^2$, may be made separately from the supporting bar B, and in this case I form the reinforcing arm $B^3$, in the manner shown in Figs 4 and 5, by forming the front end of the said arm $B^3$ in the shape of a fork having lugs or eyes $B^4$ engaging the pivot bolt C, on the outer faces of the lugs D'. See Fig. 5.

If desired, the reinforcing arm may be formed at its front end in the shape of a hook $B^5$, shown in dotted lines in Fig. 4, the hook extending under the eyes $B^4$ of the supporting bar B, and fastened thereto by a set screw $B^6$, as is indicated in dotted lines in Fig. 4. In each case the bar is connected by the bolt G, as above described, with the said bottom A' and the supporting bar B.

Having thus fully described my invention, I claim as new and desire to secure by Letters Patent—

1. A wagon seat, provided with a reinforcing arm extending up over the front edge of the seat on to the top surface of the seat bottom, substantially as shown and described.

2. A wagon seat, comprising a socket adapted to receive the upper end of the post, a supporting bar pivoted on the said socket, and a reinforcing arm extending over the front edge of the seat bottom on to the top surface thereof, the said arm being connected with the said bar, substantially as shown and described.

3. A wagon seat, provided with a seat supporting bar adapted to be bolted to the under side of the seat bottom, and a reinforcing arm engaging the top surface of the seat bottom and connected with the said reinforcing bar, substantially as shown and described.

CHARLES C. FIELD.

Witnesses:
THEO. G. HOSTER,
C. SEDGWICK.